(12) United States Patent
Zeng et al.

(10) Patent No.: US 11,664,524 B2
(45) Date of Patent: May 30, 2023

(54) BATTERY MODULE AND BATTERY PACK

(71) Applicant: CONTEMPORARY AMPEREX TECHNOLOGY CO., LIMITED, Ningde (CN)

(72) Inventors: Yuqun Zeng, Ningde (CN); Fenggang Zhao, Ningde (CN); Chuanlian Chen, Ningde (CN); Yangzhi Huang, Ningde (CN); Pengfei Gao, Ningde (CN); Jihua Yao, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 761 days.

(21) Appl. No.: 16/436,683

(22) Filed: Jun. 10, 2019

(65) Prior Publication Data
US 2020/0091474 A1    Mar. 19, 2020

(30) Foreign Application Priority Data

Sep. 14, 2018    (CN) .......................... 201811074761.6

(51) Int. Cl.
*H01M 10/04* (2006.01)
*H01M 50/209* (2021.01)
(Continued)

(52) U.S. Cl.
CPC ..... *H01M 10/0431* (2013.01); *H01M 50/209* (2021.01); *H01M 50/505* (2021.01); *H01M 50/509* (2021.01); *H01M 50/522* (2021.01)

(58) Field of Classification Search
None
See application file for complete search history.

(56) References Cited

U.S. PATENT DOCUMENTS

2010/0015519 A1*   1/2010   Trester ................ H01M 50/502
                                                                   174/68.2
2011/0293992 A1   12/2011   Hsu et al.
(Continued)

FOREIGN PATENT DOCUMENTS

CN             258069      11/2003
CN         207719261 U      8/2018
(Continued)

OTHER PUBLICATIONS

DE102009000675A1 Translation from Espacenet (Year: 2009).*
(Continued)

*Primary Examiner* — Nathanael T Zemui
(74) *Attorney, Agent, or Firm* — Suiter Swantz pc llo (57) ABSTRACT

The present disclosure relates to a battery module and a battery pack. The battery module includes a plurality of battery units connected in series; at least two electrode output connecting pieces each disposed at an output end of the plurality of battery units; a plurality of bridging busbars, each connecting two battery units spaced by one or more other battery units among the plurality of battery units; and an adjacent busbar connecting two adjacent battery units among the plurality of battery units. An electrical connection path is formed in the battery module by the electrode output connecting pieces, the bridging busbars and the adjacent busbar. The battery module according to the present disclosure is applicable in diverse situations, and capable of improving safety performance and energy density.

18 Claims, 6 Drawing Sheets

(51) Int. Cl.
   *H01M 50/522*   (2021.01)
   *H01M 50/505*   (2021.01)
   *H01M 50/509*   (2021.01)

(56) References Cited

U.S. PATENT DOCUMENTS

| | | | | |
|---|---|---|---|---|
| 2014/0308561 | A1* | 10/2014 | Goesmann | H01R 11/284 429/121 |
| 2019/0259996 | A1* | 8/2019 | Fritz | H01M 50/20 |

FOREIGN PATENT DOCUMENTS

| | | |
|---|---|---|
| DE | 102009000675 A1 | 8/2010 |
| DE | 102016213081 A1 | 1/2018 |
| DE | 102016121265 A1 | 5/2018 |
| KR | 20180010576 A | 1/2018 |
| WO | 2018015038 A1 | 1/2018 |
| WO | 2018083303 A1 | 5/2018 |

OTHER PUBLICATIONS

WO2018015038A1 Translation from Espacenet (Year: 2018).*
KR20180010576A Translation from Espacenet (Year: 2018).*
Office Action dated Jul. 7, 2020 for Japanese Patent Application No. 2019-105049.
Extended Search Report dated Oct. 7, 2019 for EP Application No. 19177849.7.
Office Action in European Application No. 19177849.7-1108, dated Aug. 4, 2021, 17 pages.
Official Action in Chinese Patent Application No. 202110402787.4, 10 pages.

* cited by examiner

BATTERY MODULE AND BATTERY PACK

CROSS-REFERENCE TO RELATED APPLICATIONS

The present application claims priority to Chinese Patent Application No. 201811074761.6, filed on Sep. 14, 2018, the content of which is incorporated herein by reference in its entirety.

TECHNICAL FIELD

The present disclosure relates to the technical field of energy storage device, and in particular, relates to a battery module and a battery pack.

BACKGROUND

With a transformation of energy resource structure, the sustainable electric energy has gradually replaced traditional fossil fuels and become a mainstream energy source. For example, electric vehicles are replacing traditional fuel vehicles and becoming a new trend of development, accompanying with a rapid development of rechargeable batteries.

As regards a battery module in which a plurality of battery units are connected in series, a conventional arrangement of electrode connection pieces limits a diversity of configuration of the battery module, and has deficiencies with respect to heat dissipation and safety, which are not conducive to energy density of the battery module.

SUMMARY

In view of the above problems, the present disclosure provides a battery module and a battery pack.

According to a first aspect of the present disclosure, a battery module is provided. The battery module includes: a plurality of battery units connected in series; at least two electrode output connecting pieces each disposed at an output end of the battery module; a plurality of bridging busbars, each connecting two battery units spaced by one or more other battery units among the plurality of battery units; and an adjacent busbar connecting two adjacent battery units among the plurality of battery units. An electrical connection path is formed in the battery module by the at least two electrode output connecting pieces, the plurality of bridging busbars and the adjacent busbar.

In an embodiment, each of the plurality of battery units is a single battery cell.

In an embodiment, each of the plurality of battery units is a battery group formed by connecting a plurality of battery cells in parallel.

In an embodiment, two battery units of the plurality of battery units that are spaced by one battery unit located therebetween are connected through one of the plurality of bridging busbars.

In an embodiment, two battery units of the plurality of battery units that are spaced by odd numbered battery units located therebetween are connected through each of the plurality of bridging busbars.

In an embodiment, two battery units of the plurality of battery units that are spaced by even numbered battery units located therebetween are connected through one of the plurality of bridging busbars.

In an embodiment, the plurality of bridging busbars has a same length or a same shape.

In an embodiment, the at least two electrode output connecting pieces are disposed on a same side of the battery module.

In an embodiment, the at least two electrode output connecting pieces extends from the battery module in a same direction.

According to a second aspect of the present disclosure, a battery pack is provided. The battery pack includes the battery module according to the first aspect.

The technical solution provided by the present disclosure brings the following benefits.

In the battery module provided by the present disclosure, a plurality of battery units is connected in series by the bridging busbars and the adjacent busbar. This can provide an important support to a diversity of configurations of the battery module.

For example, arranging electrode output connecting pieces of the battery module on a same side of the battery module can not only reduce a dimension of the whole battery module and enhance the energy density of the battery module, but also reduce a length of the bridging busbar. In this way, the bridging busbars will generate less heat during operation of the battery module, and thus the safety performance of the battery module can be improved.

Further, errors are less likely to occur during an assembly process of the battery module when the bridging busbars have a smaller length, thereby facilitating the assembly process of the battery module.

REFERENCE SIGNS

1—battery unit;
11—battery cell;

111—electrode terminal;
2—electrode output connecting piece;
3—adjacent busbar;
4—bridging busbar.

Accompanying drawings illustrating embodiments according to the present disclosure are incorporated in the description as a part, and used to elaborate the principle of the present disclosure.

DESCRIPTION OF EMBODIMENTS

The present disclosure will be further described below by specific embodiments of the present disclosure in combination with the drawings.

The terms "first", "second", "third", or "fourth" in the description are used for a purpose of description only, but not intended to indicate or imply relative importance thereof. Unless otherwise specified or stated, term "a plurality of" means two or more, terms "connected", "fixed", etc. shall be understood in a broad sense. For example, the term "connected" includes various connection manners, such as fixed connection, detachable connection, integrated connection, electrical connection, direct connection or indirect connection via an intermediate medium. These skilled in the art are able to understand specific meanings of the above terms in accordance with specific circumstances.

It should be understood that terms indicating orientations or positions, such as "upper", "lower", "left", "right", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

An embodiment of the present disclosure provides a battery module and a battery pack (not shown). The battery pack includes the battery module, and can also include a battery management system, a battery thermal management system, a battery system power distribution box, a soft connection, electrical interfaces and the like. The thermal management system can include an evaporator, a fan, an air duct, a temperature detecting mechanism and the like. One or more battery modules can be provided inside a single battery pack, and a specific number of the battery modules can be selected depending on an actual requirement.

Figure 1:
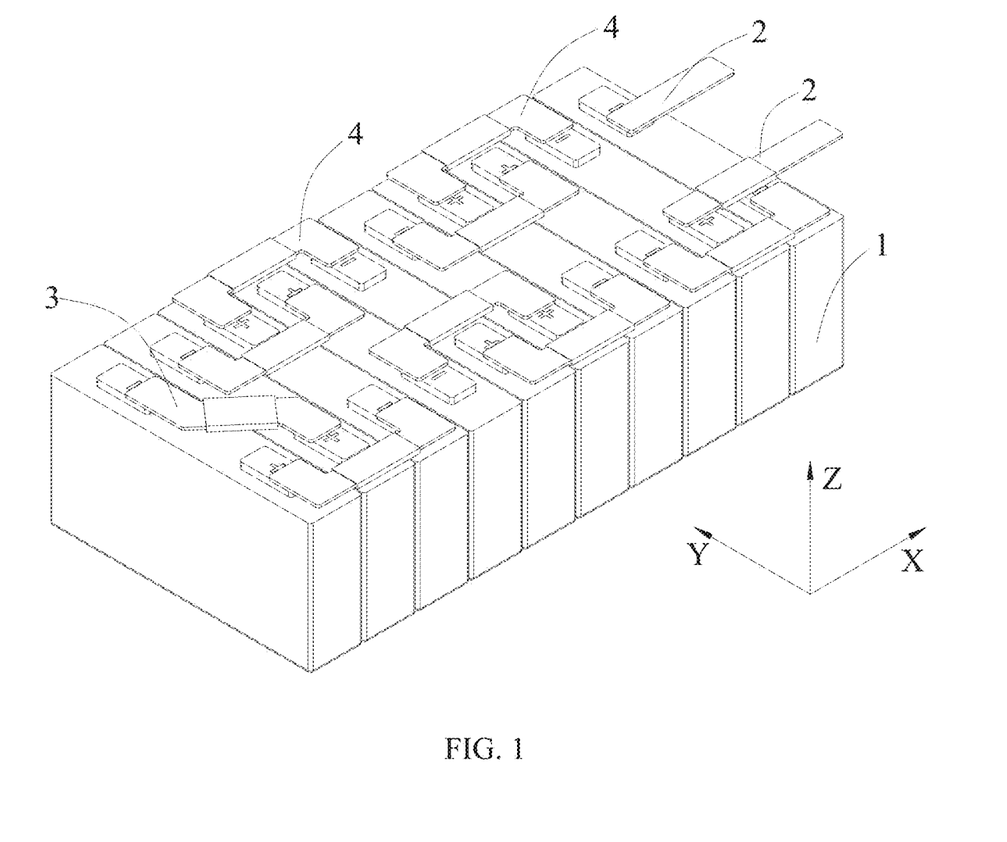
FIG. 1 is a structural schematic diagram of a battery module according to an embodiment of the present disclosure.
Figure 2:
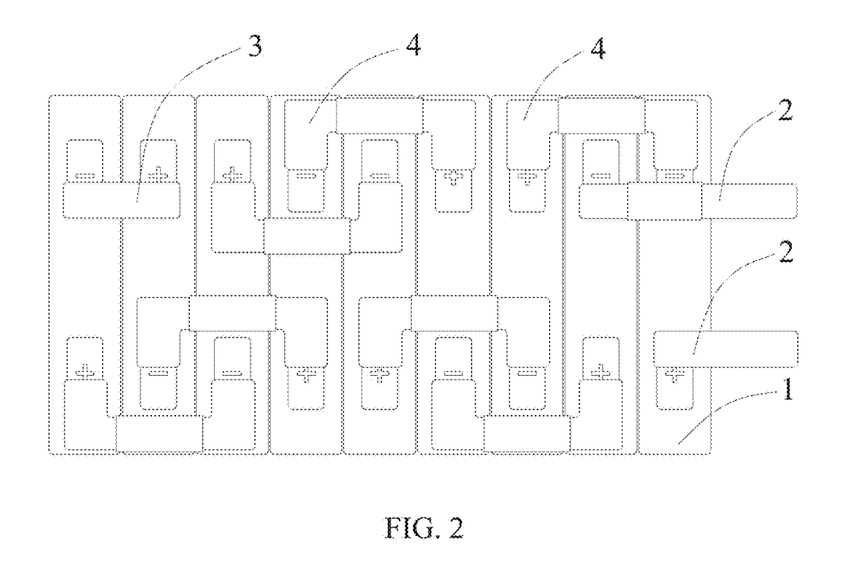
FIG. 2 is a structural top view of a battery module according to an embodiment of the present disclosure.
Figure 3:
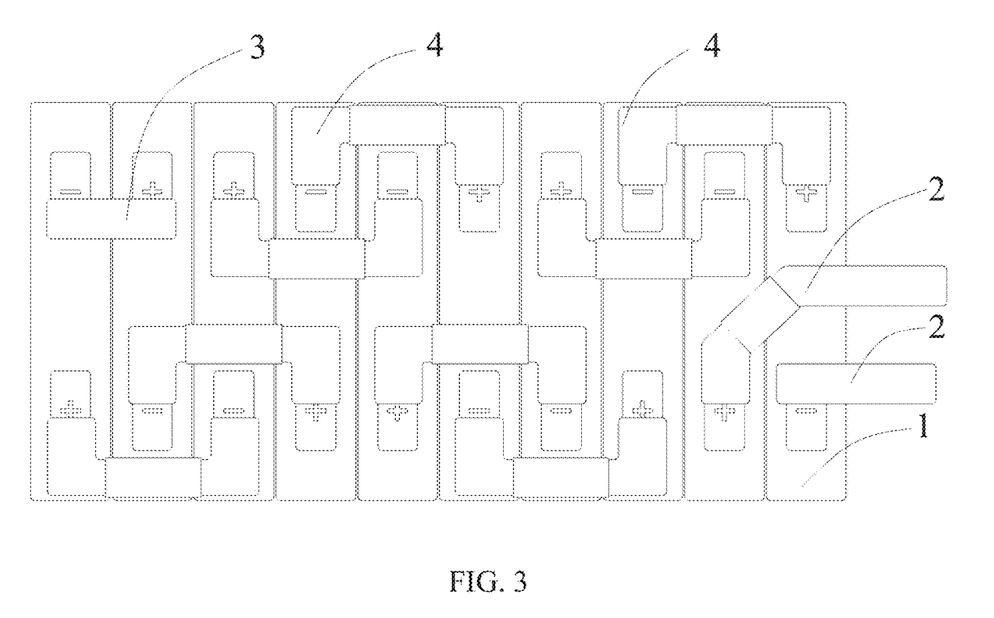
FIG. 3 is a structural top view of another battery module according to an embodiment of the present disclosure.
Figure 4:
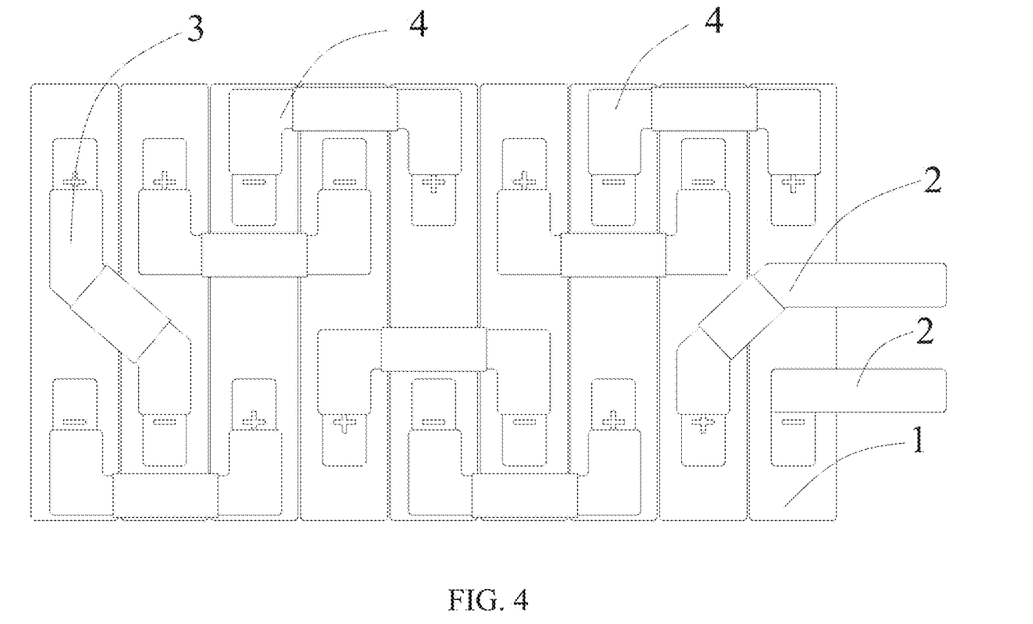
FIG. 4 is a structural top view of yet another battery module according to an embodiment of the present disclosure.

A specific structure of the battery module will be described in detail as follow. As shown in FIG. 1, a single battery module includes a frame (not shown) and a plurality of battery units 1 disposed within the frame. Specifically, as shown in FIG. 1, the battery unit 1 can be a single battery cell 11. In another embodiment, as shown in FIG. 5, the battery unit 1 also can be a battery group formed by connecting a plurality of battery cells 11 in parallel, aiming to increase current output of the entire battery module.

Figure 5:
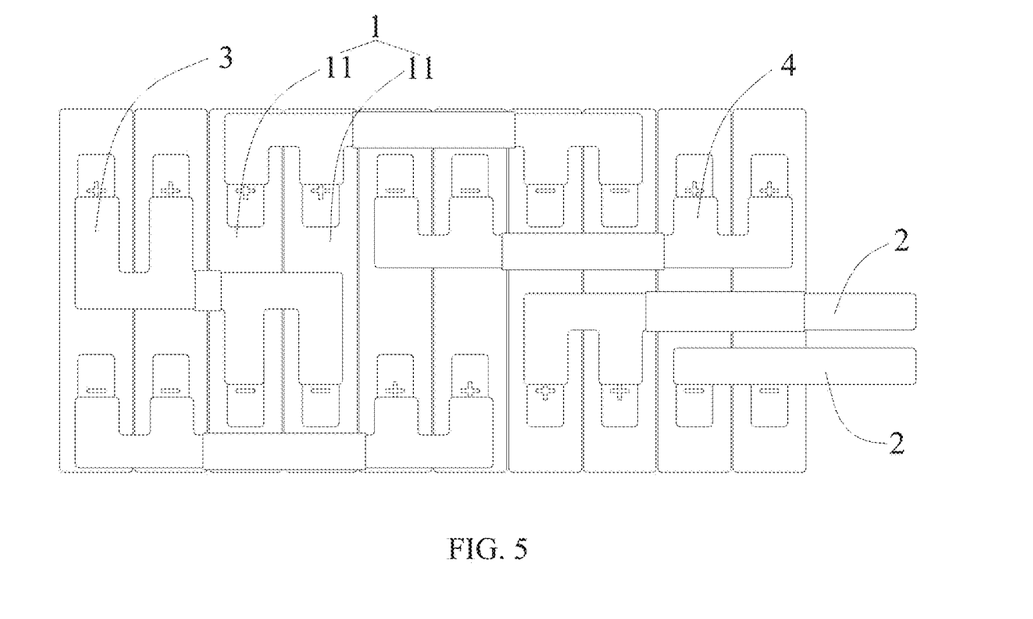
FIG. 5 is a structural top view of yet another battery module according to an embodiment of the present disclosure.
Figure 6:
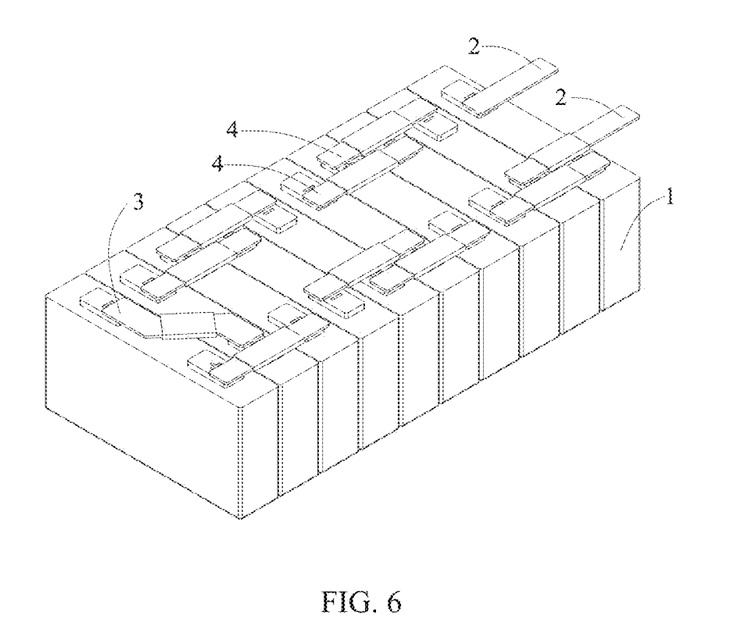
FIG. 6 is a structural top view of yet another battery module according to an embodiment of the present disclosure.
Figure 7:
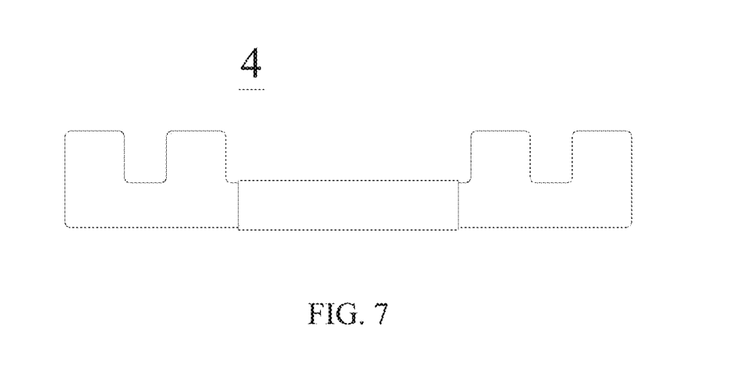
FIG. 7 is a structural schematic diagram of a bridging busbar in a battery module according to an embodiment of the present disclosure.
Figure 8:
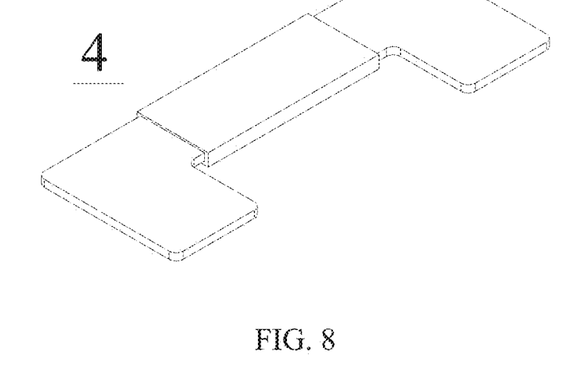
FIG. 8 is a structural schematic diagram of another bridging busbar in a battery module according to an embodiment of the present disclosure.
Figure 9:
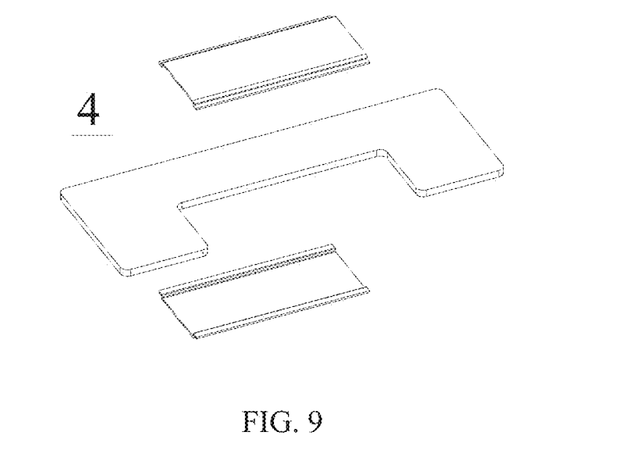
FIG. 9 is an exploded view of the bridging busbar shown in FIG. 8.
Figure 10:
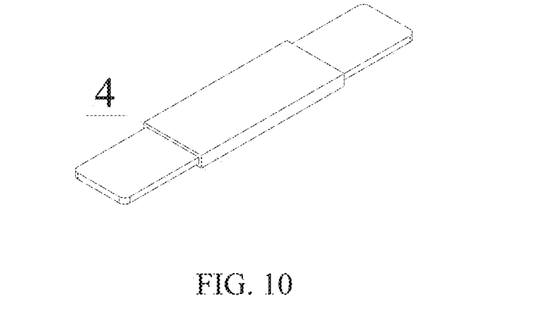
FIG. 10 is a structural schematic diagram of an adjacent busbar in a battery module according to an embodiment of the present disclosure.
Figure 11:
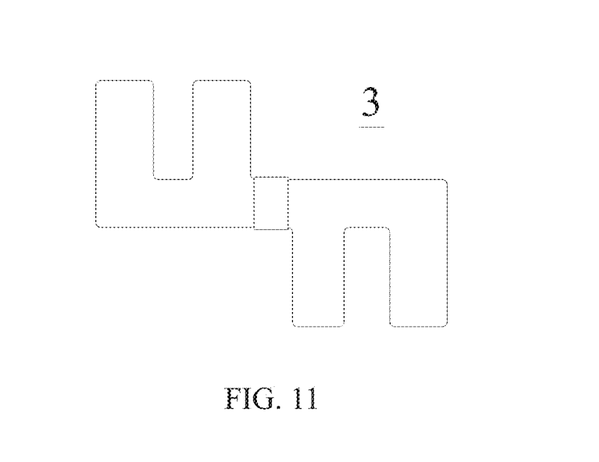
FIG. 11 is a structural schematic diagram of yet another bridging busbar in a battery module according to an embodiment of the present disclosure.
Figure 12:
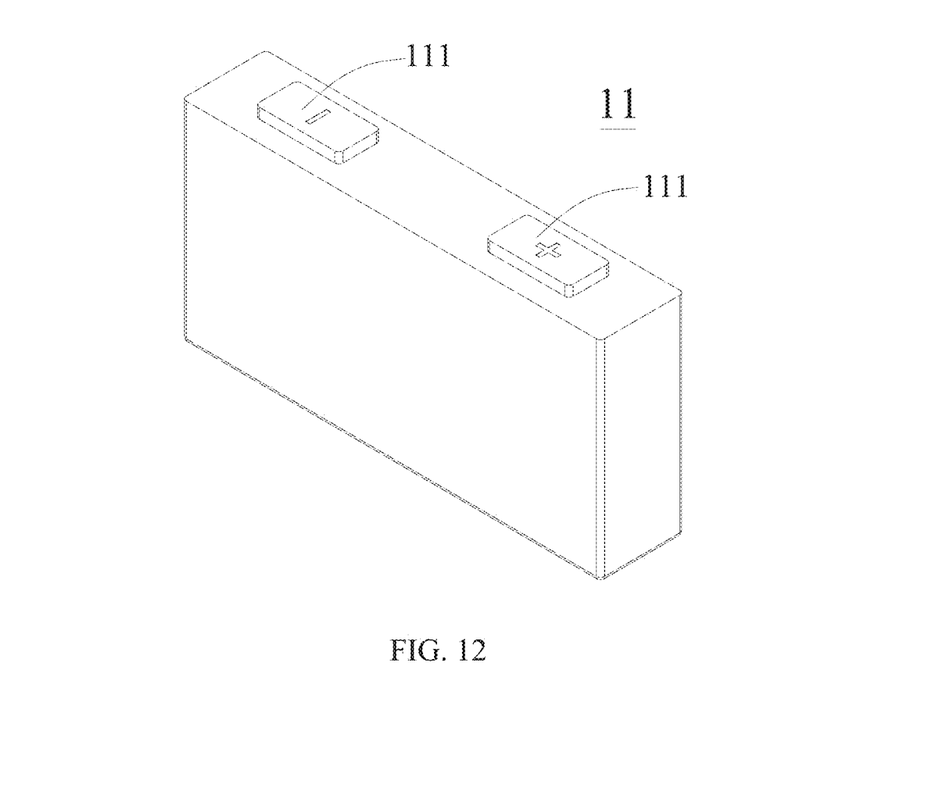
FIG. 12 is a structural schematic diagram of a battery pack according to an embodiment of the present disclosure.

For example, the battery unit 1, as shown in FIG. 5, includes two battery cells 11. These two battery cells 11 are connected to one another in parallel through a bridging busbar 4, and further connected to another battery unit 1 in series. Specifically, as shown FIG. 12, the battery cell 11 can be in a rectangular structure and include two electrode terminals 111 having opposite polarities.

In an assembly process of the battery module, the plurality of battery units 1 is connected in series through the bridging busbar 4 and an adjacent busbar 3. In order to output electric energy of the entire battery module, the battery module is further provided with two electrode output connecting pieces 2 disposed at output ends of the battery module, acting as a positive output electrode and a negative output electrode, respectively.

With the aid of the bridging busbar 4, a length of the adjacent busbar can be reduced, and in the meantime, the two electrode output connecting pieces 2 can be disposed at a same side of the battery module, which is conducive to heat dissipation. In this way, a higher energy density can be achieved in a same assembly space, while a high safety can be guaranteed.

Specifically, in a process of connecting the plurality of battery units 1 in the battery module, among the plurality of battery units 1, two battery units 1 that are spaced by one battery unit 1 located therebetween are connected in series through the bridging busbar 4, and two adjacent battery units 1 are connected in series through the adjacent busbar 3. After being connected in series through the bridging busbars 4 and the adjacent busbars 3, the remaining two battery units 1 of the plurality of battery units 1 are connected to the two electrode output connecting pieces 2, respectively, thereby forming an electrical connection path in the battery module.

In order to prevent the bridging busbar 4 from contacting the battery units 1 bridged by the bridging busbar 4, which would otherwise results in a short circuit, in an embodiment shown in FIGS. 7-10, the bridging busbar 4 is provided with a protective sleeve made of an insulating material. As another embodiment, a safety space can be reserved between the bridging busbar 4 and the battery unit 1 bridged by the bridging busbar 4, so as to avoid the short circuit caused by their mutual contact.

Specifically, the electrode output connecting piece 2, the bridging busbar 4 and the adjacent busbar 3 can each be a structure made of a conductive material such as metal. In an embodiment, the electrode output connecting piece 2, the bridging busbar 4 and the adjacent busbar 3 are made of copper or aluminum. As shown in FIGS. 6-11, the bridging busbar 4 and the adjacent busbars 3 both have a structure having a sheet shape, and a thickness and a length thereof can be selected depending upon practical requirements.

The two electrode output connecting pieces 2 of the battery module can be disposed on a same side of the battery module. For example, as shown in FIGS. 1-6, the two electrode output connecting pieces 2 are both disposed on a same side of the battery module in the length direction. During the assembly process of the battery module, it is only need to reserve an installation space at a position where the two electrode output connecting pieces 2 are located, and the reserved installation space can be formed by the frame (such as the end plate) of the module. Such arrangement can reduce the space occupied by the battery module when compared with an arrangement in which the electrode output connecting pieces 2 are disposed on the same side in a height direction or a width direction. Further, in a case of an unaltered dimension of the frame of the battery module, disposing the two electrode output connecting pieces 2 of the battery module on the same side can further avoid the short circuit in the battery module, which may be caused by the electrode output connecting piece 2 getting into contact with the frame when the battery module is pressed and there is a small distance therebetween. It should be understood that, as shown in FIG. 1, the length direction of the battery module is direction X, the width direction of the battery module is direction Y, and the height direction of the battery module is direction Z.

In view of the above, in the battery module provided in the present disclosure, the plurality of battery units 1 is connected in series through the bridging busbars 4 and the adjacent busbars 3. In the battery module, the two electrode output connecting pieces 2 can be disposed on a same side of the battery module, or on different sides of the battery module, so that positions and orientations of the two electrode output connecting pieces 2 can be flexibly changed depending upon actual requirement during the design and assembling process of the battery module, thereby promoting the applications of the battery module in diverse situations.

In another aspect, when the two electrode output connecting pieces 2 of the battery module are both disposed on a same side of the battery module, the dimension of the whole battery module can be reduced, the energy density of the battery module can be enhanced, and the length of the bridging busbar 4 can be reduced. In this way, the bridging busbars 4 will generate less heat during the operation of the battery module, and thus the safety performance of the battery module can be improved. Further, errors are less likely to occur during the assembly process of the battery module when the bridging busbars 4 have a smaller length, thereby facilitating the assembly process of the battery module.

When the battery units 1 are connected by the bridging busbars 4, the bridging busbar 4 can bridge one battery unit 1, two battery units 1, or more battery units 1, which is not specifically limited herein. In an embodiment, in the assembly process of a battery module, the bridging busbar 4 can bridge an odd number of battery units 1, so as to connect these battery units 1 together with the adjacent busbar 3. In another embodiment, the bridging busbar 4 can bridge an even number of battery units 1, so as to connect these battery units 1 together with the adjacent busbar 3. In the manufacturing process of the battery module, the connection manner can be selected according to practical situations.

In an embodiment, as shown in FIGS. 1-6, two battery units 1 that are spaced by one battery unit 1 located therebetween are connected in series through the bridging busbar 4, and two adjacent battery units 1 are connected in series through the adjacent busbar 3, so as to connect all the battery units 1 together and form an electrical connection path. In the assembly process of a battery module adopting such connection manner, its operation is easy, and since the bridging busbars 4 and the adjacent busbars 3 are simple in structure, this can facilitate manufacturing and assembling.

Further, the plurality of bridging busbar 4 can have a same length or a same shape, which can standardize components in the battery module, thereby further simplifying the processing of the bridging busbars 4 as well as the process of assembling the bridging busbars 4 with the battery units 1.

In an embodiment, the two electrode output connecting pieces 2 are arranged to extend in a same direction. As shown in FIGS. 1-6, the two electrode output connecting pieces 2 both extend along the length direction of the battery module, so that the electrode output connecting pieces 2 would not contact the frame of the battery module, which would otherwise result in the short-circuit in the battery module, even if the battery module is subjected to squeezing from several directions other than the length direction during its operation.

The embodiments according to the present disclosure discussed above are merely illustrative embodiments, but not intended to limit the present disclosure. The technical solution according to the present disclosure can be modified in various manners. Any modifications, equivalent replacements, improvements within the spirit and principles of the present disclosure should be included in the scope of protection of the present disclosure.

What is claimed is:
1. A battery module, comprising:
a plurality of battery units connected in series;
at least two electrode output connecting pieces each disposed at an output end of the battery module;
a plurality of bridging busbars, each bridging busbar connecting two battery units spaced by one or more other battery units among the plurality of battery units; and
an adjacent busbar connecting two adjacent battery units among the plurality of battery units,
wherein an electrical connection path is formed in the battery module by the at least two electrode output connecting pieces, the bridging busbars and the adjacent busbar,
wherein each of the plurality of bridging busbars is provided with a protective sleeve made of an insulating material to prevent the plurality of bridging busbars from contacting corresponding battery units bridged by the plurality of bridging busbars.

2. The battery module according to claim 1, wherein each of the plurality of battery units is a single battery cell.

3. The battery module according to claim 1, wherein each of the plurality of battery units is a battery group formed by connecting a plurality of battery cells in parallel.

4. The battery module according to claim 1, wherein two battery units of the plurality of battery units that are spaced by one battery unit located therebetween are connected through one of the plurality of bridging busbars.

5. The battery module according to claim 1, wherein two battery units of the plurality of battery units that are spaced by odd numbered battery units located therebetween are connected through each of the plurality of bridging busbars.

6. The battery module according to claim 1, wherein two battery units of the plurality of battery units that are spaced by even numbered battery units located therebetween are connected through one of the plurality of bridging busbars.

7. The battery module according to claim 1, wherein the plurality of bridging busbars has a same length or a same shape.

8. The battery module according to claim 1, wherein the at least two electrode output connecting pieces are disposed on a same side of the battery module.

9. The battery module according to claim 1, wherein the at least two electrode output connecting pieces extend from the battery module in a same direction.

10. A battery pack, comprising a battery module, wherein the battery module comprises:
a plurality of battery units connected in series;
at least two electrode output connecting pieces each disposed at an output end of the battery module;
a plurality of bridging busbars, each bridging busbar connecting two battery units spaced by one or more other battery units among the plurality of battery units; and
an adjacent busbar connecting two adjacent battery units among the plurality of battery units,
wherein an electrical connection path is formed in the battery module by the at least two electrode output connecting pieces, the bridging busbars and the adjacent busbar,
wherein each of the plurality of bridging busbars is provided with a protective sleeve made of an insulating material to prevent the plurality of bridging busbars from contacting corresponding battery units bridged by the plurality of bridging busbars.

11. The battery pack according to claim 10, wherein each of the plurality of battery units is a single battery cell.

12. The battery pack according to claim 10, wherein each of the plurality of battery units is a battery group formed by connecting a plurality of battery cells in parallel.

13. The battery pack according to claim 10, wherein two battery units of the plurality of battery units that are spaced by one battery unit located therebetween are connected through one of the plurality of bridging busbars.

14. The battery pack according to claim 10, wherein two battery units of the plurality of battery units that are spaced by odd numbered battery units located therebetween are connected through each of the plurality of bridging busbars.

15. The battery pack according to claim 10, wherein two battery units of the plurality of battery units that are spaced by even numbered battery units located therebetween are connected through one of the plurality of bridging busbars.

16. The battery pack according to claim 10, wherein the plurality of bridging busbars has a same length or a same shape.

17. The battery pack according to claim 10, wherein the at least two electrode output connecting pieces are disposed on a same side of the battery module.

18. The battery pack according to claim 10, wherein the at least two electrode output connecting pieces extend from the battery module in a same direction.

* * * * *